United States Patent [19]

Shu et al.

[11] Patent Number: 5,022,466
[45] Date of Patent: Jun. 11, 1991

[54] METHOD FOR STEAM FLOODING PROFILE CONTROL

[75] Inventors: Paul Shu, Cranbury, N.J.; Winston R. Shu, Dallas, Tex.

[73] Assignee: Mobil Oil Corporation, Fairfax, Va.

[21] Appl. No.: 517,890

[22] Filed: May 2, 1990

Related U.S. Application Data

[63] Continuation-in-part of Ser. No. 292,795, Jan. 3, 1989, Pat. No. 4,940,091.

[30] Foreign Application Priority Data

Dec. 11, 1989 [CA] Canada .................................. 292795

[51] Int. Cl.⁵ ...................... E21B 33/138; E21B 43/24
[52] U.S. Cl. ..................................... 166/263; 166/270; 166/272; 166/288; 166/295; 166/297
[58] Field of Search ............... 166/263, 270, 272, 273, 166/288, 295, 302, 297

[56] References Cited

U.S. PATENT DOCUMENTS

| | | |
|---|---|---|
| 2,881,838 | 4/1959 | Morse et al. |
| 3,155,160 | 11/1964 | Craig, Jr. et al. |
| 3,259,186 | 7/1966 | Dietz. |
| 3,557,562 | 1/1971 | McLaughlin, Jr. et al. |
| 3,608,638 | 9/1971 | Terwillinger ........................ 166/272 |
| 3,682,244 | 8/1972 | Bowman et al. ............... 166/272 X |
| 3,692,111 | 9/1972 | Breithaupt et al. ............ 166/272 X |
| 3,918,521 | 11/1975 | Snavely, Jr. et al. ............... 166/272 |
| 3,997,004 | 12/1976 | Wu .................................. 166/272 X |
| 4,074,757 | 2/1978 | Felber et al. .................... 166/272 X |
| 4,157,322 | 6/1979 | Colegrove ........................... 166/300 |
| 4,257,650 | 3/1981 | Allen ..................................... 299/2 |
| 4,489,783 | 12/1984 | Shu ..................................... 166/272 |
| 4,658,898 | 4/1987 | Paul et al. ........................... 166/270 |
| 4,716,966 | 1/1988 | Shu ..................................... 166/295 |
| 4,793,415 | 12/1988 | Holmes et al. .................. 166/272 X |
| 4,804,043 | 2/1989 | Shu et al. ........................ 166/272 X |
| 4,819,725 | 4/1989 | Mims et al. ..................... 166/263 X |
| 4,903,768 | 2/1990 | Shu ................................. 166/272 X |
| 4,940,091 | 7/1990 | Shu et al. ........................ 166/295 X |

Primary Examiner—George A. Suchfield
Attorney, Agent, or Firm—Alexander J. McKillop; Charles J. Speciale; Charles A. Malone

[57] ABSTRACT

A method for minimizing well recompletions in a multiple zone hydrocarbonaceous fluid containing formation. A steam flooding enhanced oil recovery (EOR) is conducted in the upper zone of said formation via fluidly communicating injector and producer wells which penetrate the upper and lower zones. The wells are unperforated and do not communicate with each other in the lower zone. Thereafter, a temperature activated gellable composition is injected into the upper zone where it forms a solid gel. Afterwards, both wells are perforated so as to fluidly communicate with each other in the lower productive interval. Subsequently, a steamflooding EOR operation is conducted in the lower level and hydrocarbonaceous fluids are removed therefrom. Polymers utilized in the gellable composition include polyvinyl alcohol and polyacrylamide cross-linked with phenol and an aldehyde producing compound sufficient to form a phenolic resin in situ.

18 Claims, 2 Drawing Sheets

METHOD FOR STEAM FLOODING PROFILE CONTROL

RELATED APPLICATIONS

This application is a continuation-in-part of Ser. No. 292,795, now U.S. Pat. No. 4,940,091 which was filed on Jan. 3, 1989. It is also related to Ser. No. 292,845, now U.S. Pat. No. 4,947,933 which was filed on Jan. 3, 1989.

FIELD OF THE INVENTION

This invention relates to the use of temperature activated gels that can be used for profile control after a steam flood so that increased amounts of hydrocarbonaceous fluids can be obtained from a steam underswept zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, and thermal recovery.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the underswept low permeability, oil rich zones. Among the polymers examined for improving waterflood conformance are metal cross-linked polysaccharides, metal cross-linked polyacrylamides, and organic-crosslinked polyacrylamides.

Polymeric gels are disclosed in several U.S. patents. Among these is U.S. Pat. No. 4,157,322 which issued to Colegrove on June 5, 1979. This gel is formed from water, a polysaccharide polymer, an acid generating salt and a melamine resin. A polymeric gel is disclosed in U.S. Pat. No. 4,658,898 which issued to Paul et al. on Apr. 21, 1987. This patent discloses an aqueous solution of heteropolysaccharide S-130 combined with cations of basic organic compounds which cations contained at least two positively charged centers. U.S. Pat. No. 4,716,966, issued to Shu on Jan. 5, 1988, discloses a gel formed by amino resins such as melamine formaldehyde which modify biopolymers in combination with transitional metal ions. These patents are hereby incorporated by reference herein.

Basic to the problem of diverting displacing fluid with polymeric gels is the necessity of placing the polymer where it is needed, i.e. in the high permeability zone. This is possible when Xanthan biopolymers are cross-linked with metal ions such as $Cr^{+3}$ above ground to give gels. These gels are shear stable and shear thinning. They can be injected into the formation where they then reheal. Due to the gel's rheological properties, they will of necessity go into high permeability zones. However, many other gel systems are formed in-situ. One system disclosed in U.S. Pat. No. 3,557,562 contains acrylamide monomer, methylene-bis-acrylamide as an organic cross-linker, and a free radical initiator. This system undergoes polymerization in the formation to give a polyacrylamide cross-linked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of cross-linking hydrolyzed polyacrylamide. Even though the polyacrylamide solution has a viscosity greater than water, it is not capable of showing the selectivity that a gel can. Thus, polyacrylamides cross-linked with chromium in-situ can also go into low permeability zones. It is not useful to cross-link polyacrylamides above ground and inject them as gels, because polyacrylamide gels undergo shear degradation. There are very few gels that are selective and thermally stable.

In addition to the creation of "thief" zones during a waterflooding recovery technique, steam flooding or steam stimulation processes create a unique situation in a formation which is gravity override due to the steam's low density. Because of the steam's low density, the sweep path of the steam is therefore biased towards the top of the payzone. Thus, the area invaded by the override steam may or may not be of low permeability. Although steam preferentially enters a high permeability or thief zone, the high temperature of the steam will also remove hydrocarbonaceous fluids from portions of low permeability zones. As the distance increases from steam entry into the formation, the temperature will decrease. As long as the temperature is hot enough hydrocarbonaceous fluids will be removed from the "thief" zone as well as portions of low permeability zones.

When steam has broken through to a production well during a steamflood, a heated portion of the formation will communicate with an injector well. This heated portion may include portions of both high and low permeability steam override zones. For this reason, a gel system which can selectively enter a high permeability "thief" zone may not enter a low permeability zone. Thus, a size selective gel may not prevent steam from entering into a heated low permeability zone which has been depleted of hydrocarbonaceous fluids.

Therefore, what is needed is a method of forming a solid gel in areas of a multiple productive zone formation which areas have been heated to a temperature above 300° F. so as to minimize well recompletions.

SUMMARY OF THE INVENTION

This invention is directed to a method for minimizing well recompletions in a hydrocarbonaceous fluid containing formation having multiple productive intervals. An upper productive interval is heated to a temperature in excess of about 300° F. Preferably a steam flood enhanced oil recovery method is used to heat the upper productive zone. The upper productive zone is penetrated by fluidly communicating injector and producer wells. These wells are not perforated at a lower interval and do not fluidly communicate with each other.

When steam breakthrough occurs at the production well and a temperature in excess of about 300° F. is reached in the upper productive zone, steam injection is ceased. Afterwards, a temperature activated gellable composition is injected into said upper productive interval through both the injector and producer wells. Here it forms a solid gel thereby blocking said upper productive interval to fluid flow.

Thereafter, the injector and producer wells are perforated at a lower productive interval so as to allow for fluid communication between said wells. Once said wells have been recompleted at the lower productive interval, a steam-flooding enhanced oil recovery operation is commenced into said lower productive interval to remove hydrocarbonaceous fluids therefrom.

The gellable composition utilized herein forms a rigid solid gel upon reaching a temperature of about 350° F. to about 450° F. in the upper productive interval. The gellable composition contains a water dispersible polymer, an aldehyde containing compound which decomposes to yield formaldehyde, and a phenolic compound. Upon reaching the activating temperature the cyclic dimer decomposes to yield an aldehyde which in turn reacts with the phenolic compound to form phenolic resin, the gelant, in situ. Thereafter, the phenolic resin gels the polymer thereby forming a rigid gel.

This rigid gel reduces the transmissibility of hydrocarbonaceous fluids through the upper productive interval. In addition to reducing the transmissibility of fluids through the heated upper interval, the rigid gel causes steam from a subsequent steam flooding or steam stimulation operation to be diverted to a deeper level in the producing interval, thereby producing additional hydrocarbonaceous fluids to the surface.

Gellable aqueous compositions which can form a solid gel upon reaching a temperature above 300° F. are comprised of selected water dispersible polymers, phenolic compounds, and aldehyde producing compounds. Polymers which are utilized herein are selected from a member of the group consisting of polyvinyl alcohol, polyvinyl alcohol copolymers, polyacrylamide, polyvinyl amine, sulfonated polyvinyl alcohol, and poly(acrylamide-co-acrylamido-2-methylpropane sulfonate). Phenolic compounds which can be used include phenol, catechol, resorcinol, phloroglucinol, 4,4'-diphenol, 1,3-dihydroxy- naphthalene, and related similar compounds. Aldehyde producing compounds which can be utilized herein upon reaching a temperature above about 300° F. include trioxane, paraformaldehyde, and tetraoxane.

It is therefore an object of this invention to provide for a temperature activated gellable composition which can be delivered into a heated upper productive zone having a temperature sufficient to activate said composition and selectively form a solid gel therein.

It is another object of this invention to provide for a temperature activated gellable composition which can be delivered into a formation's steam flooded zone having a temperature above about 300° F. and thereafter form a solid gel therein.

It is yet another object of this invention to provide for a composition which avoids forming a solid gel in a cooler zone of lesser permeability or an unheated zone of a formation.

It is another further object of this invention to provide for a composition that will minimize gel damage to a cooler zone of lower permeability while closing pores in a higher permeability zone having a temperature above about 300° F.

It is a still yet further object of this invention to provide for a composition which will increase the efficiency of a drive fluid through a formation thereby increasing the yield of hydrocarbonaceous fluids therefrom.

DESCRIPTION OF THE PREFERRED EMBODIMENTS

Figure 1:
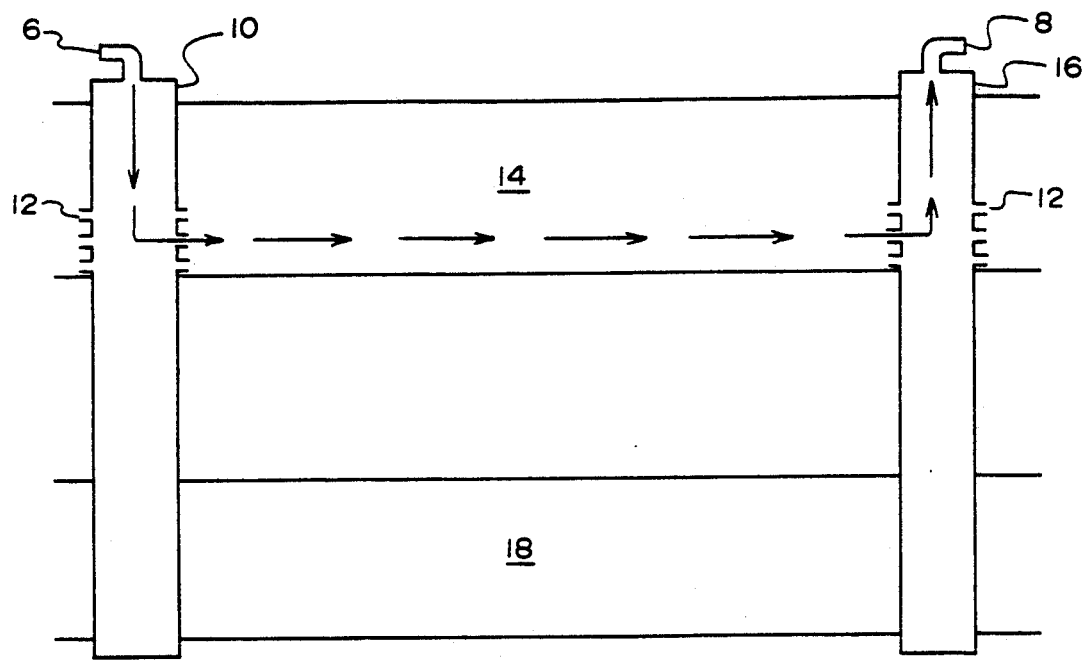
FIG. 1 is a diagrammatic plan view of a formation where steam has passed through a high permeability zone or upper productive interval into a production well.

During the recovery of hydrocarbonaceous fluids from a multiple productive interval formation wherein a steam flooding process is utilized, as is shown in FIG. 1, steam enters conduit 6 of injection well 10. Afterwards, steam exits injection well 10 via perforations 12 and enters high permeability zone or upper productive interval 14. Steam and hydrocarbons obtained from high permeability zone or upper productive interval 12 exit through production well 16 via perforations 12. Thereafter, steam and hydrocarbonaceous fluids exit production well 12 via conduit 8. During this steam flooding process, the high permeability zone or upper productive interval 14 is heated up by the steam. While being heated, a temperature contour is developed in either a steam flooded or a steam stimulated formation. Thus, the upper productive interval or zones swept by steam in said productive interval have the highest temperatures in the formation while the unswept areas or areas not receiving steam in the formation have the lowest. This concept is illustrated in FIG. 3.

Figure 3:
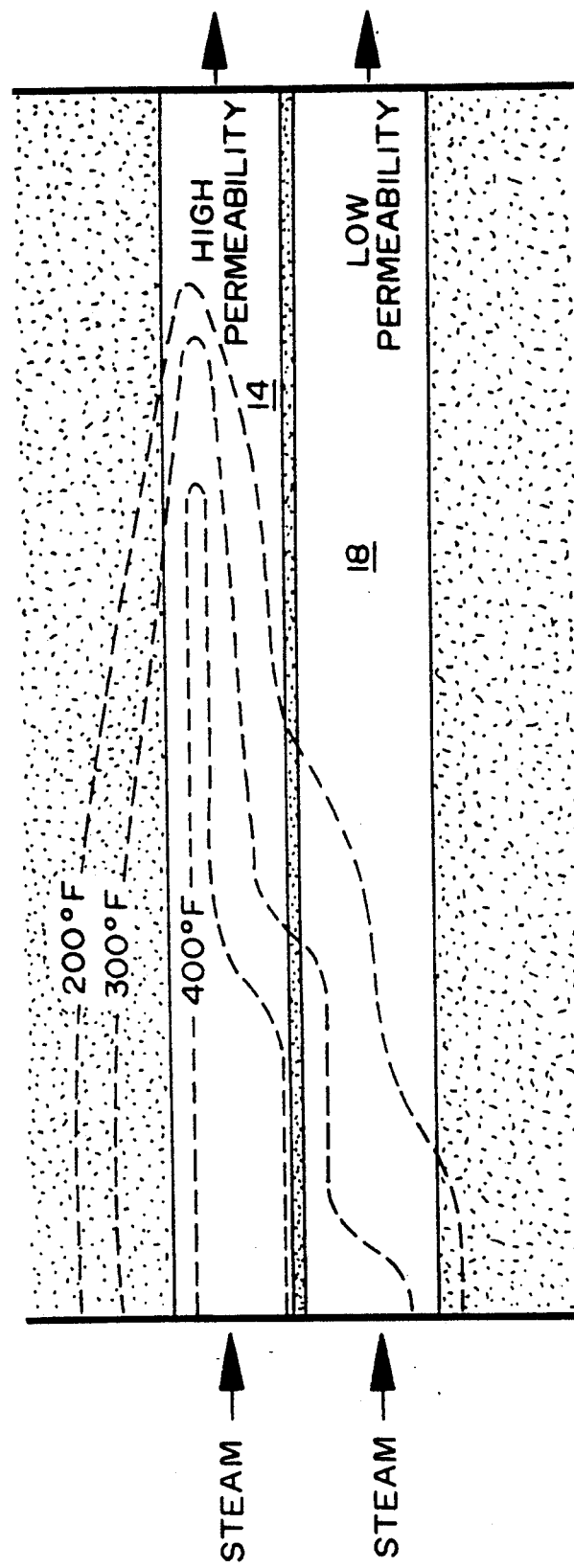
FIG. 3 is a schematic representation which illustrates temperature distribution into high and low permeability zones of a formation during steam flooding or steam stimulation.

The concept illustrated in FIG. 3 is equally applicable to a thermal technique where steam is utilized with a single well in a multiple productive interval formation. Of course this well is not perforated at a lower productive interval. This technique is known as the "huff and puff" method. This method is described in U.S. Pat. No. 3,259,186 which is hereby incorporated by reference herein. In this method, steam is injected via a well in quantities sufficient to heat an upper subterranean hydrocarbon-bearing formation in the vicinity of the well. The well is then shut-in for a soaking period, after which it is placed on production. After production has declined in the upper productive interval the "huff and puff" method may again be employed on the same well at a lower productive interval to again stimulate production. Fluid communication with the lower productive interval is obtained by recompleting or perforating the well at the lower interval after forming a solid gel in the upper productive interval.

The application of single well schemes employing steam injection as applied to heavy oils or bitumen is described in U.S. Pat. No. 2,881,838, which utilizes gravity drainage. This patent is incorporated by reference herein. An improvement of this method is described in a later patent, U.S. Pat. No. 3,155,160, in which steam is injected and appropriately timed while pressuring and depressuring steps are employed. Where applicable to a field pattern, the "huff and puff" technique may be phased so that numerous wells are on an injection cycle while others are on a production cycle; the cycles may then be reversed. This patent is hereby incorporated by reference herein.

U.S. Pat. No. 4,257,650 describes a method for recovering high viscosity oils from subsurface formations using steam and an inert gas to pressurize and heat the formation and the oil which it contains. The steam and the inert gas may be injected either simultaneously or sequentially, e.g. steam injection, followed by a soak period, followed by injection of inert gas. Inert gases referred to include helium, methane, carbon dioxide, flue gas, stack gas and other gases which are noncondensable in character and which do not interact either with the formation matrix or the oil or other earth materials contained in the matrix. This patent is hereby incorporated by reference herein.

When it becomes uneconomical to continue injecting steam to recover hydrocarbonaceous fluids from an upper productive interval via a "huff and puff" method or from a steam flooding method where an injection and a producer well are employed as shown in FIG. 1, steam injection into injection well 10 is ceased. Eventually, steam and hydrocarbonaceous fluids cease to flow into producer well 16 from the upper productive interval. Producer well 16 is heated to a temperature often in excess of 300° F. In order to obtain hydrocarbonaceous fluids from lower productive interval 18, steam entry into heated upper interval 14 is ceased. Communication therefore has to be established between injector well 10 and producer well 16 at the lower productive level 18.

To accomplish this, in one embodiment of this invention, a temperature activated gellable composition is directed down producer well 16. Prior to directing said composition into producer well 16, the temperature within the well is determined. The temperature can be measured by a downhole device as is known by those skilled in the art. If the well temperature is hot enough to activate the gellable composition so as to cause a solid or rigid gel to form in the well, the well is cooled. Several methods can be used to cool the well. In one embodiment, a cooling fluid preferably water, can be injected as a spacer prior to injecting the gellable composition into well 16 and the formation. Injection of the cooling fluid is continued until producer well 16 has been cooled to a temperature of about 300° F. to about 450° F.

In another embodiment, the cooling fluid can be circulated into producer well 16 through a concentric string consisting of an inner and an outer tubing. The cooling fluid flows down the inner tubing and out of the concentric string by the outer tubing. During the circulation of the cooling fluid into and out of producer well 16, the concentric string remains in contact with producer well 16 so as to cool it to a temperature of about 300° F. to about 450° F. Cooling producer well 16 in this manner allows for more precise control of the cooling process. Upon obtaining a desired temperature sufficient to prevent premature gellation of the gellable composition, circulation of cooling fluid into producer well 16 is stopped.

After circulation of cooling fluid into the concentric string is stopped, the temperature activated gellable composition is injected down producer well 16 via the concentric string. To accomplish this a surface return valve on the concentric string is closed thereby stopping the circulation of fluid from the concentric string.

The activated gellable composition is displaced into higher productive interval 14 by continued injection or pumping into the concentric string. Displacement of the temperature activated gellable composition can be aided by placing a trailing fluid e.g. water into producer well 16 through a pressure actuated valve or rupture disk. A pressure activated valve or rupture disk is also used to cause a temperature activated gellable composition to flow into the producer well from the concentric string after the surface return valve is closed on said concentric string.

Figure 2:
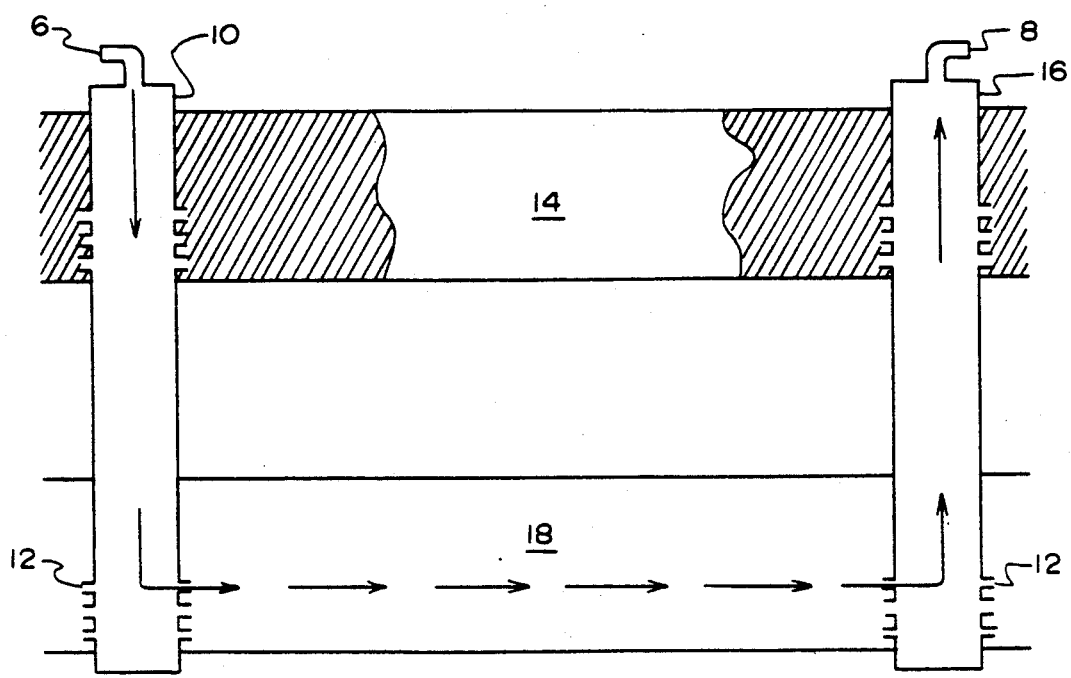
FIG. 2 is a diagrammatic plan view where the high permeability zone or upper productive interval has been closed with a heat reactive gel while steam is passing through a low permeability zone or lower productive interval.

Alternatively, as shown in FIG. 2, to prevent the temperature activated gellable composition from polymerizing in producer well 16 after forming a solid gel in upper level 14, an injection string e.g. a coiled tubing (not shown) can be used. To keep the gellable composition in a cooled condition, the injection string can be insulated. Additionally, the gellable composition can be kept cool by using an injection string in combination with the concentric string.

Once the injected gellable composition circulates up producer well 16 to heated upper producing interval 14, it forms a rigid solid gel in producing interval 20 upon reaching a temperature of from about 300° to about 450° F. Since the lower productive interval 18 is less than about 300° F., the gellable composition remains ungelled in that interval. Ungelled material can be removed from lower productive interval 18 by pumping it out or injecting water to circulate it out.

After allowing sufficient time for the gellable composition to form a solid gel in upper level 14, a steam flood enhanced oil recovery method is subsequently commenced in injection well 10 and communication is established with producer well 16 via lower productive level 18 through perforations 12. Both wells are recompleted at lower level 18 for fluid communications. Utilization of this method increases sweep efficiency in the formation while enhancing the recovery of additional hydrocarbonaceous fluids. The entire process can be repeated until a desired steam or water to oil ratio has been obtained. Should it become necessary, additional perforations can be directed through injector well 10 and producer well 16 into lower productive interval 18.

Aqueous gellable heat activated compositions which can be utilized herein are comprised of a polymer, a phenolic compound, and an aldehyde. Polymers utilized herein are water dispersible polymers. The term "polymer" is employed generically to include both homopolymers and copolymers. The term "water-dispersible polymers" is used generically to include those polymers which are truly water-soluble and those polymers which are dispersible in water or in other aqueous medium to form stable colloidal suspensions which can be gelled. Also, the term "aqueous dispersion" is utilized generically to include both true solutions and stable colloidal suspensions of components of the composition of this invention which can be gelled as will be described herein. Water-dispersible polymers which are used herein are selected from a member of the group consisting of polyvinyl alcohol, polyacrylamide, sulfonated polyvinyl alcohol, and poly(acrylamide-co-acrylamido-2-methylpropane sulfonate). Polyvinyl alcohol (PVA) at various degrees of hydrolysis are useful. Other polymers containing OH, $NH_2$, $CONH_2$, and SH functional groups are also useful. Polyvinyl amine, and copolymers containing the previously mentioned functional groups are useful. Any of these water-dispersible polymers are placed into an aqueous mixture in amount of from about 0.5 to about 5.0 wt. %. The aqueous medium can comprise fresh water, brackish water, or sea water, and mixtures thereof. Polyacrylamide and poly(2-acrylamido-2-methylpropane sulfonate) are discussed in U.S. Pat. No. 4,440,228 which issued on Apr. 3, 1984 to Swanson. This patent is hereby incorporated herein in its entirety.

After placing the selected water-dispersible polymer into the aqueous medium, a phenolic compound is added to the mixture. Phenolic compounds which can be used herein include phenol, naphthol, catechol, resorcinol, phloroglucinol, 4,4'-diphenol, 1,3-dihydroxynaphthalene, and related similar compounds. The amount of phenolic compound utilized should be in excess of 0.5 wt. % or higher. The amount of phenolic compound used herein should be sufficient to impart the desired gellation effect within the desired time period.

Once the phenolic compound has been added, a water-dispersible aldehyde is mixed into the aqueous mixture. Under proper conditions of use, both aliphatic and aromatic monoaldehydes, and dialdehydes, can be used. The aliphatic monoaldehydes containing from 1 to about 10 carbon atoms per molecule are presently preferred. Representative examples of such aldehydes include formaldehyde, trioxane, tetraoxane, polyoxymethylene, and other polymeric aldehydes. Representative examples of dialdehydes include glyoxal, glutraldehyde, terephthaldehyde, and mixtures thereof. The term "water-dispersible" is employed generically to include both those aldehydes which are truly water-soluble and those aldehydes of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be small but in an amount sufficient to cause gellation of an aqueous dispersion of a polymer, the aldehyde, and the phenolic compound. As a general guide, the amount of aldehyde used in preparing the gel compositions herein will be in the range of from about 0.05 to about 5, preferably 1.0 to about 3.0 wt. % based on the total weight of the composition.

A preferred temperature activated gellable mixture comprises polyvinyl alcohol, phenol, and trioxane. The effect of temperature on said mixture is shown in Table 1. When exposed to a formation having a temperature of about 300° to about 350° F. or higher, a firm gel will form in about 1 day to about 15 days when 0.05 to about 0.5 wt. % of sodium hydroxide is utilized as is shown in Table 2. Polyvinyl alcohol is used in amounts of about 0.5 to about 5.0 wt. %. Phenol is used in about 0.5 to about 5.0 wt. % or higher. The phenol to trioxane ratio is about 1:5 to 0.5, preferably about 0.75. The polyvinyl alcohol/phenol weight ratio is from about 0.2 to about 2. Of course, a lower ratio is used when other higher molecular weight polymers are utilized. Polymer concentration is directly proportional to the gel strength. A rigid gel is formed which is proportional to the total materials content.

TABLE 1

| Temperature Sensitivity of PVA/Phenol/Trioxane *Gelation | | | | | |
|---|---|---|---|---|---|
| Temp, °F. | 200 | 300 | 350 | 400 | 450 |
| Gel Time, days | no gel | no gel | 1 | 1 | 1 |

*2.5% PVA, 4% phenol, 3% trioxane

TABLE 2

| Effect of NaOH Concentration on Gel *Time | | | | |
|---|---|---|---|---|
| NaOH, % | 300° F. | 350° F. | 400° F. | 450° F. |
| 0.05 | No gel | 15 days | 8-9 days | 4 days |
| 0.1 | " | 15 days | 5-7 days | 2 days |
| 0.2 | " | 12 days | 2 days | 1 day |
| 0.3 | " | 9 days | 1 day | 1 day |
| 0.5 | " | 6 days | 1 day | 1 day |

*2.5% PVA, 4% phenol, 3% trioxane

Prior to injecting the aqueous temperature activated gellable mixture, the formation is heated as mentioned above during a steam flooding or steam stimulation enhanced oil recovery process. A formation temperature of about 350° F. is preferred. The method of this invention can also be used when the area in or substantially near either the injection well or the production well has been heated to the desired temperature. Should it be desired, the gellable composition can be injected into both the injector and producer wells so as to effectively close off those heated areas in close proximity to those wells. This concept is depicted in FIG. 2.

This method is also particularly beneficial when it is desired to close the heated area around a production well which has suffered a premature steam breakthrough. In this situation, steam injection is ceased and the temperature activated gellable mixture is injected into the production well for a time sufficient to enter the areas which comprise the premature breakthrough zone. Afterwards the gellable mixture in that zone is allowed to form a solid gel. Once the solid gel is formed, an enhanced oil recovery method in which a drive fluid is utilized can be injected either through the injection well or the production well to recover hydrocarbonaceous fluids from a less permeable zone of the formation.

As demonstrated, the novelty of this invention is that the cross-linking reaction is activated at elevated temperatures greater than about 350° F. The cross-linking reaction is not activated at temperatures under 300° F. At high temperatures, trioxane, a cyclic dimer of formaldehyde decomposes to yield formaldehyde which in turn reacts with phenol to form phenolic resin, the gellant, in situ. Phenolic resin then gels the polymer.

Where it is desired to obtain increased sweep efficiency, gels of this invention can be used to plug a previously swept portion of a formation which has been heated to a temperature in excess of 300° F. Said gels can be directed to areas of increased porosity. Once a solid gel has formed, hydrocarbonaceous fluids can be removed from an area of lesser permeability by utilization in any of the below methods.

Additionally, the embodiments described above can be used where the producer well is in-casing gravel packed for sand control.

Steamflood processes which can be utilized after closing productive interval 18 with the gels described herein are detailed in U.S. Pat. Nos. 4,489,783 and 3,918,521 issued to Shu and Snavely, respectively. These patents are hereby incorporated by reference herein.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for minimizing well recompletions in a formation having multiple intervals of hydrocarbonaceous fluids comprising:
   a) penetrating said formation with at least one injector well and one spaced apart producer well where fluid communication exists between said wells at an upper interval but not at a lower interval between said wells;
   b) heating by steam injection the upper interval via said injector well to a temperature above about 300° F. sufficient to cause a temperature activated aqueous gellable mixture to form a solid gel which mixture contains
      i) a water dispersible polymer,
      ii) a phenolic compound, and
      iii) an aldehyde producing compound which upon reaching a temperature above about 300° F. decomposes to yield an aldehyde and form a phenolic resin in situ in combination with the phenolic compound sufficient to gel the polymer;
   c) terminating steam injection into the upper interval upon reaching said temperature having removed hydrocarbonaceous fluids from said upper interval;
   d) injecting thereafter into said upper interval the temperature activated gellable mixture which mixture enters said upper interval heated to said temperature, where it is heated to a temperature sufficient to cause a solid gel to form and close pores in said heated zone regardless of the permeability of said zone;
   e) perforating the injector well and producer wells at a lower interval so as to provide for fluid communication between said wells; and
   f) injecting steam into said injector well which bypasses the upper interval and enters the lower interval thereby removing hydrocarbonaceous fluids therefrom via said producer well.

2. The method as recited in claim 1 where a spacer volume of cold water is pumped into the formation after step d) which keeps any ungelled mixture from forming a solid gel.

3. The method as recited in claim 1 where the gellable mixture comprises water, polyvinyl alcohol, phenol, and trioxane which forms a solid gel at a temperature of about 300° F. or greater.

4. The method as recited in claim 1 where the gellable mixture comprises water, polyvinyl alcohol, phenol, and trioxane where the polyvinyl alcohol to phenol ratio is about 0.2 to about 2.0, the phenol to trioxane ratio is about 0.5 to about 1.5, and a gel forms in from about 1 to about 15 days with the addition of about 0.05 to about 0.5 wt. % of sodium hydroxide.

5. The method as recited in claim 1 where said gellable mixture comprises a polymer such as polyacrylamide, sulfonated polyvinyl alcohol, poly(acrylamide-co-acrylamido-2-methylpropane sulfonate) cross-linked with a phenolic resin which is formed in situ.

6. The method as recited in claim 1 where steps a) through f) are repeated until hydrocarbonaceous fluids have been removed from all desired intervals of the formation.

7. The method as recited in claim 1 where said wells are cased.

8. The method as recited in claim 1 where said gellable mixture is injected into said upper interval via both the injector and producer wells.

9. The method as recited in claim 1 wherein said gellable mixture is injected into said upper interval via the producer well.

10. A method for minimizing well recompletions in a formation having multiple intervals or zones of hydrocarbonaceous fluids comprising:
    a) penetrating said formation with at least one injector well and one spaced apart producer well where fluid communication exists between said wells at a lower interval but lacks said communication at a higher interval;
    b) heating by steam injection into the injector well, said lower interval to a temperature above about 300° F. sufficient to cause a temperature activated aqueous gellable mixture to form a solid gel which mixture contains
       i) a water dispersible polymer,
       ii) a phenolic compound, and
       iii) an aldehyde producing compound which upon reaching a temperature above about 300° F. decomposes to yield an aldehyde and form a phenolic resin in situ in combination with the phenolic compound sufficient to gel the polymer;
    c) terminating steam injection into said lower interval upon reaching said temperature having removed hydrocarbonaceous fluids from said lower interval;
    d) injecting thereafter into said lower interval the temperature activated gellable mixture which mixture enters said lower interval heated to said temperature, where it is heated to a temperature sufficient to cause a solid gel to form and close pores in said heated zone regardless of the permeability of said zone;
    e) perforating said injector and producer wells at a higher interval so as to allow fluid communication between said wells; and
    f) injecting steam into said injector well which enters said higher interval thereby removing hydrocarbonaceous fluids therefrom via said producer well.

11. The method as recited in claim 10 where a spacer volume of cold water is pumped into the formation after step d) which keeps any ungelled mixture from forming a solid gel.

12. The method as recited in claim 10 where the gellable mixture comprises water, polyvinyl alcohol, phenol, and trioxane which forms a solid gel at a temperature of about 300° F. or greater.

13. The method as recited in claim 10 where the gellable mixture comprises water, polyvinyl alcohol, phenol; and trioxane where the polyvinyl alcohol to phenol ratio is about 0.2 to about 2.0, the phenol to trioxane ratio is about 0.5 to about 1.5, and a gel forms in from about 1 to about 15 days with the addition of about 0.05 to about 0.5 wt. % of sodium hydroxide.

14. The method as recited in claim 10 where said gellable mixture comprises a polymer such as polyacrylamide, sulfonated polyvinyl alcohol, poly(acrylamide-co-acrylamido-2-methylpropane sulfonate) cross-linked with a phenolic resin which is formed in situ.

15. The method as recited in claim 10 where said wells are cased.

16. The method as recited in claim 10 where steps a) through f) are repeated until hydrocarbonaceous fluids have been removed from all desired intervals of the formation.

17. The method as recited in claim 10 where said gellable mixture is injected into said lower interval via both the injector and producer wells.

18. The method as recited in claim 10 where said gellable mixture is injected into said lower interval via the producer well.